June 18, 1929.  A. A. WARNER  1,717,481
LUBRICANT RETAINER AND DUST GUARD FOR UNIVERSAL JOINTS
Filed Oct. 19, 1928  2 Sheets-Sheet 1
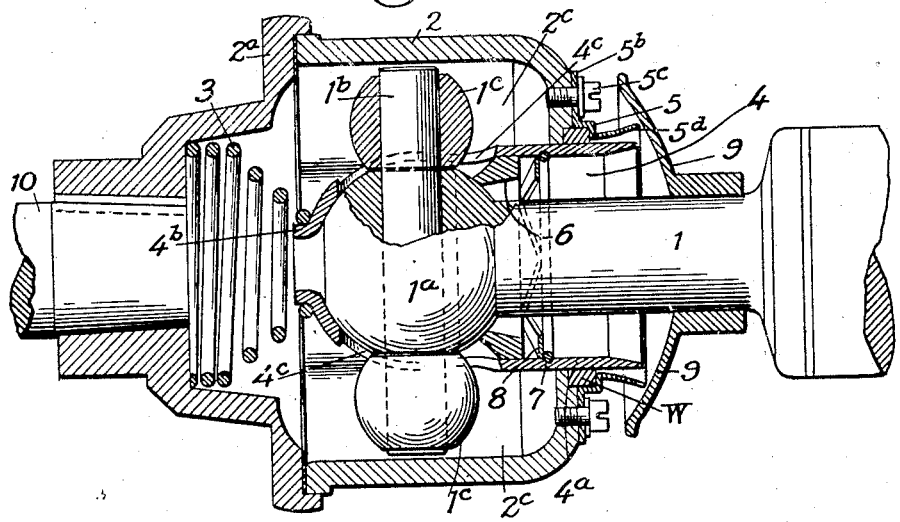
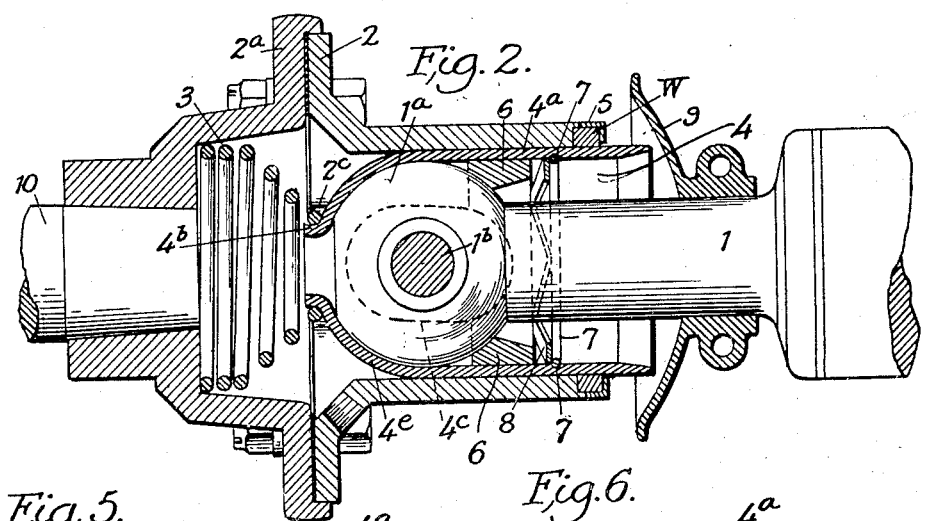
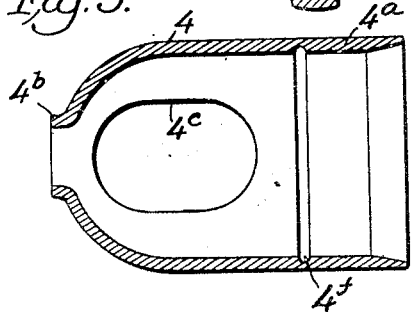
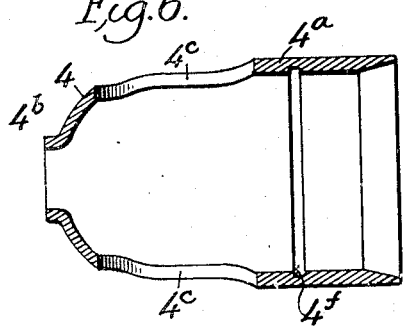
INVENTOR.
Archibald A. Warner
BY
Alexander & Dowell
ATTORNEYS

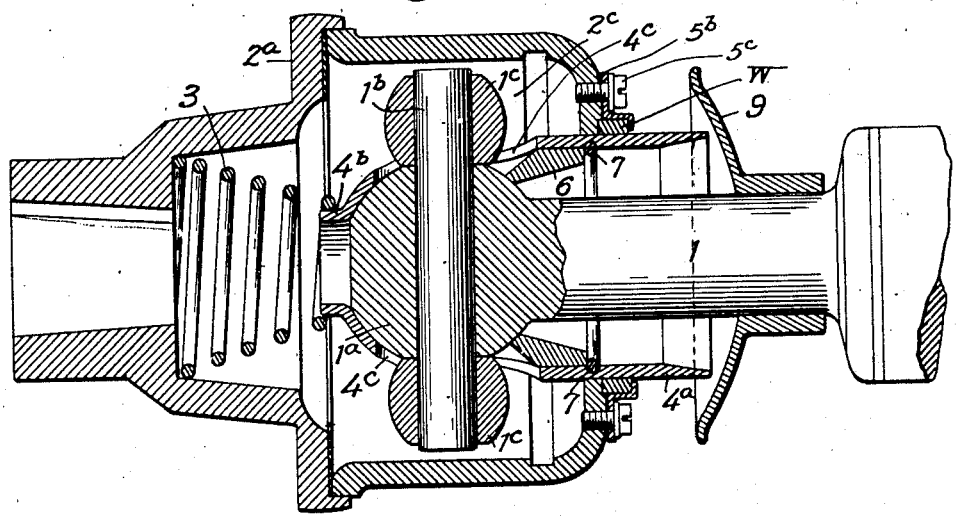
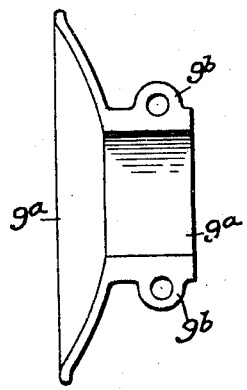
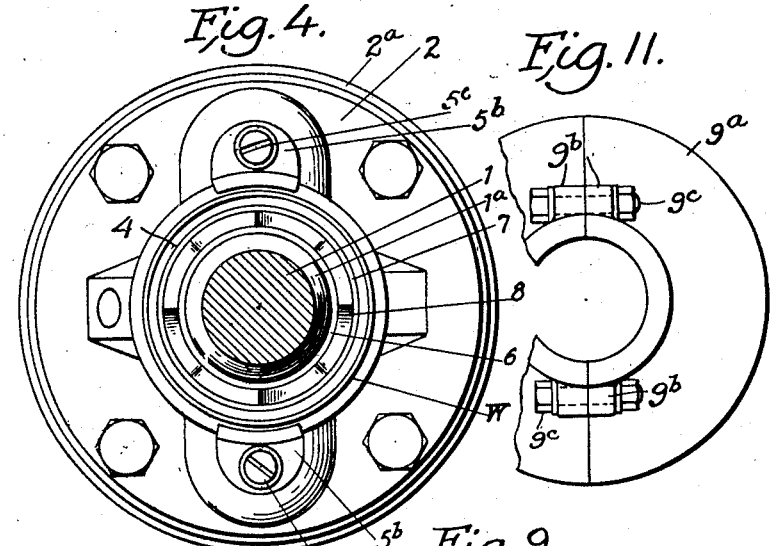
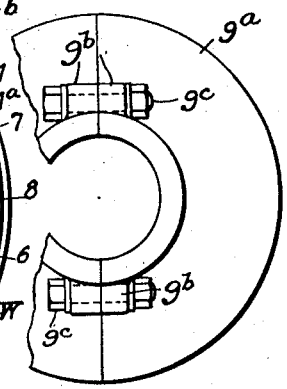
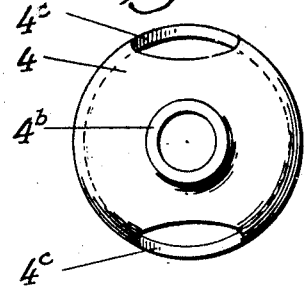
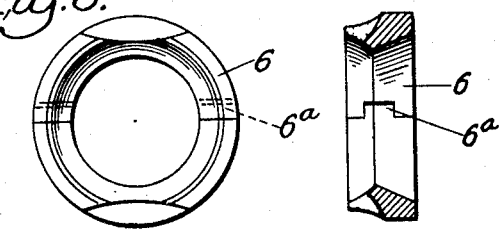
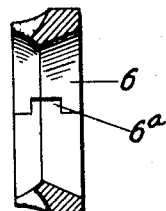

Patented June 18, 1929.

1,717,481

UNITED STATES PATENT OFFICE.

ARCHIBALD A. WARNER, OF ROYAL OAK, MICHIGAN, ASSIGNOR TO THE UNIVERSAL PRODUCTS CO., INC., OF DETROIT, MICHIGAN, A CORPORATION OF DELAWARE.

LUBRICANT RETAINER AND DUST GUARD FOR UNIVERSAL JOINTS.

Application filed October 19, 1928. Serial No. 313,560.

This application is a continuation in major part of my application for lubricant container for universal joints etc. filed October 5, 1927, Serial No. 244,188 (Case #7465).

This invention relates to universal joint couplings for use in transmitting power from a driving to a driven shaft, and has particular reference to the type of universal joint shown in John B. Flick's U. S. Patents Nos. 1,512,840 and 1,604,816, wherein the driven shaft is provided on its end with a globular head and a transverse pin carrying rollers or balls which engage diametrically opposite slots in a member fixedly attached to the adjacent end of the driving shaft, thus insuring simultaneous rotatorial movement of the shafts while permitting angular displacement of one shaft relative to the other, and slight endwise longitudinal play of one shaft relative to the other; such joints being particularly adapted for use in the transmission gear of automobiles.

The object of the present invention is to prevent loss of lubricant from such universal joints and exclude dust therefrom; and a further object is to keep large particles of dirt or gravel from being thrown into the end of the retainer. The invention consists in novel means whereby without impeding freedom of movement of the joint the lubricant will be retained in the casing and dust excluded from the interior thereof, in a simple efficient, and effective manner.

The accompanying drawings illustrate one practical embodiment of the invention and I will describe the invention with reference thereto; and summarize in the claims the novel features of construction and novel combinations of parts for which protection is desired.

In said drawings:—

Fig. 1 is a longitudinal sectional view of a universal joint equipped with my novel lubricant retaining and dust excluding devices.

Fig. 2 is a similar section taken at right angles to Fig. 1.

Fig. 3 is a view similar to Fig. 1 showing a somewhat simpler construction.

Fig. 4 is a transverse sectional end view on the line 4—4 Fig. 1, looking in the direction of the arrows.

Figs. 5, 6 and 7 are end and sectional views of the lubricant retaining member detached.

Figs. 8 and 9 are side and sectional views of the sectional washer detached.

Figs. 10 and 11 are detail side and front views of one of the members of the guard 9.

The type of joint illustrated usually comprises a shaft member 1 having a ball head $1^a$ transfixed by a pin $1^b$ on which are mounted rollers or balls $1^c$ at opposite sides of the ball head. The head $1^a$ and balls $1^c$ are entered into a casing, preferably composed of two separable members 2 and $2^a$, as shown. As shown in the aforesaid patent part 2 of the casing is provided with an axial bore slightly larger in diameter than the ball head $1^a$, and with slots $2^c$ at diametrically opposite sides of the bore in which slots the rollers $1^c$ move. The part 2 of the casing has an opening in its inner end, through which the shaft 1 enters, and its other end is provided with a flange bolted to a flange on the end of the casing member $2^a$ which may be formed on or keyed to a shaft section 10.

An expansion spring 3 is placed in the casing intermediate the inner end of the shaft 10 and the ball head $1^a$. To prevent the spring cutting the ball head $1^a$, and to guide the ball head and protect it from wear, and to prevent loss of lubricant I have provided an improved combined ball head protector, guide and lubricant retaining and dust excluding device as follows:

The protector, dust excluder and lubricant retaining devices comprise an elongated tubular member or retainer 4, preferably formed of drawn metal, having a parti-spherical inner end portion $4^e$ adapted to neatly fit the outer end of the ball head $1^a$, and having a tubular cylindric portion $4^a$ which extends inwardly beyond the ball head and through the opening in the inner end of the casing member 2. The retainer 4 is provided with diametrically opposite slots $4^c$ near its outer end for the passage of the pin $1^b$, said slots being elongated to permit the necessary oscillatory movements of the pin. The cylindric portion $4^a$ is of such length that at no time, even when the ball head is in its extreme outermost position (adjacent the member $2^a$ of the casing) will the inner end of the retaining member 4 be drawn entirely into the casing.

The cylindric portion $4^a$ prevents the protector rocking longitudinally of or in the casing. The retainer is free to move longitudinally of the casing, with the ball head, but cannot oscillate or turn with the ball head relative to the axis of pin $1^b$, or to the longitudinal axis of the casing. The ball head 1ª can move freely in all directions within the end 4 of the retainer—and the latter is capable of longitudinal sliding movements in the casing and will, under the action of spring 3 follow up the ball head in its longitudinal movements in the casing.

The lubricant retainer 4 is preferably provided with an axial opening in its end 4, next shaft 10, which opening is surrounded by an exterior flange 4ᵇ with which flange the inner end of spring 3 is engaged, as in Fig. 1. The pressure of the spring 3 is transmitted through the end 4 of the retainer to the ball head 1ª; and while the ball head can rock within the protector and retainer its rocking motions will not be transmitted to the spring 3. The part 4 of the retainer protects the ball head from wear, by contact with the spring 3, and keeps the spring in exact alignment with the axis of the casing at all times, and prevents chattering of the spring; thus enhancing the durability efficiency and wearing qualities of the joint.

The casing should be filled with lubricant to lubricate the ball head and rollers; the cylindric portion 4ª of the retainer preferably has a neat sliding fit in the opening in the inner end of the casing 2, and to prevent lubricant exuding from the casing around and exterior to the retainer a washer W is fitted around the part 4ª, at the inner end of the casing, and is secured in place by an annular member 5 which is preferably made of drawn metal and provided with radial ears 5ᵇ secured to the end of casing member 2 by screws 5ᶜ. The annulus 5 may have an outwardly flared flange 5ᵈ on its inner end as shown in Fig. 2 to enhance its appearance, and also provide means, if desired, for the attachment thereto of a flexible sleeve or jacket, not shown, such as are commonly employed to exclude dust from the interior of the casing, but when a guard such as hereinafter described is used such sleeve is not required.

To prevent lubricant from exuding from the casing into the retainer or dust entering the casing through the openings 4ᵉ in the retainer through which the pin 1ᵇ projects, suitable means may be provided to make a close joint between the retainer and the ball head 1ª. As shown in Figs. 1 and 2 an annular washer 6 (preferably made in two semi-annular sections jointed together as shown at 6ª in Figs. 8 and 9) is placed on the shaft 1, and against the ball head 1ª, the outer face of this washer being preferably recessed to fit against the ball-head, as shown. The washer 6 may be held in place by means of a wire ring 7 which is sprung into an annular recess 4ᶠ in the inner wall of part 4ª of the retainer as shown.

If desired an undulated spring washer 8 may be interposed between the ring 7 and washer 6 as indicated in Figs. 1 and 2 to yieldingly hold the washer 6 in contact with the ball head.

In order to prevent large particles of dirt or gravel being thrown into the open end of the retainer 4 against the washer 6, a shield 9 is attached to the shaft 1 adjacent the open end of the retainer 4. This shield is preferably concavo-convex, its concave side being opposite and preferably slightly overlapping the open outer end of retainer 4, as indicated in Figs. 1 and 3. This shield 9 is preferably made of two separable similar halves 9ª, see Figs. 10 and 11, provided with opposed ears 9ᵇ through which fastening bolts 9ᶜ are passed, see Fig. 3, to secure the halves together and clamp the guard upon the shaft 1.

When the parts are assembled as shown in Fig. 1 the space in the casing between the retainer and the shaft 10 should be packed with lubricant, so that all the moving parts will be properly lubricated during the operation thereof.

When the joint is in use there is more or less relative movement of the ball head and rollers in the casing; and centrifugal force will tend to retain the lubricant in the casing—but escape of lubricant from the casing into the retainer through the opening 4ᵉ in the retainer would be prevented by the washer 6; and escape of lubricant exterior to the sleeve is prevented by the washer W.

The construction also effectually excludes dust and grit from the interior of the casing thereby keeping the lubricant clean and efficient and lessens wear of the parts. The guard 9 will prevent large particles of dirt or gravel from being thrown into the rear open end of the retainer 4, and also will prevent the entrance of fine dirt and dust therein and thus protects the washer 6 from injury and displacement.

I claim:

1. In a universal joint of the character specified, a casing, a shaft having a ball head engaging the casing; a tubular retainer member loosely connected with the ball head and extending out of the casing, and means cooperating with said member to prevent escape of lubricant from the casing.

2. In a universal joint as set forth in claim 1; a guard attached to the shaft adjacent the outer end of the retainer, for the purpose specified.

3. In a universal joint of the character specified, a casing, a shaft having a ball head entered in the casing; a tubular retainer loosely connected with the ball head and extending out of the casing, and means exterior to the retainer engaging the outer surface thereof to prevent escape of lubricant from the casing.

4. In a universal joint as set forth in claim 3, means for preventing the escape of lubricant around the ball head and into and through the retainer.

5. In a universal joint for the purpose specified, a casing, a shaft having a parti-globular portion extending in the casing, a joint within the casing connecting said shaft and casing, a tubular lubricant retainer loosely engaging the parti-globular portion and extending through the shaft opening in the casing, and means cooperating with said retainer to prevent escape of lubricant from the casing.

6. In a universal joint for the purpose specified a casing, a shaft in the casing, a universal joint connection having a parti-globular end between said shaft and the casing, a tubular lubricant retainer engaging the end of the joint connection around the shaft and extending through the shaft opening in the casing, and means cooperating with said retainer to prevent the escape of lubricant from the casing.

7. In a universal joint as set forth in claim 6, a guard attached to the shaft adjacent the outer end of the retainer, for the purpose specified.

8. In a universal joint for the purpose specified; a casing; a shaft entering the casing having a ball head on its end within the casing, a universal joint connection between said head and the casing; a retainer having an inner end loosely engaging the ball head and a tubular portion extending from the head around the shaft and through the shaft opening in the casing, and means cooperating with said member to prevent the escape of lubricant from the casing.

9. In a universal joint as set forth in claim 8, the means for preventing the escape of lubricant comprising a washer fitted against the ball head within the retainer.

10. In a universal joint as set forth in claim 8, the means for preventing the escape of lubricant comprising means engaging the outer surface of the said tubular member; and a washer fitted against the outer side of the head within the member, and means for yieldably pressing this washer against the head.

11. In a universal joint of the character specified, a casing, a shaft having a ball head engaging the casings; a tubular retainer member loosely connected with the ball head and extending out of the casing, and means cooperating with said member and exterior to the retainer and engaging the outer surface thereof to prevent escape of lubricant from the casing and means for preventing the escape of lubricant around the ball head and into the retainer.

12. In a universal joint as set forth in claim 11, a guard attached to the shaft adjacent the outer end of the retainer for the purpose specified.

13. In a universal joint for the purpose specified; a casing, a shaft entering the casing having a ball head on its end in the casing, a universal joint connection between said head and the casing; a combined ball protector and lubricant retainer comprising a member having an inner end loosely fitted to the ball and a tubular portion extending out of the casing, a washer surrounding the outer portion of the said member to prevent escape of lubricant from the casing exterior to said member, and means for preventing the escape of lubricant around the ball head and through the cylindrical member.

14. In a universal joint for the purpose specified, a casing, a shaft entering the casing and having a ball head on its end in the casing, a universal joint connection between said head and the casing; a combined ball protector and grease retainer having an inner end loosely fitted to the ball and a tubular portion extending out of the casing, a washer surrounding the tubular portion of said retainer to prevent escape of lubricant exterior to said retainer, an annulus attached to the casing and confining said washer in position; and means for preventing the escape of lubricant around the ball head and through the member.

15. In a universal joint for the purpose specified, a casing, a shaft entering the casing and having a ball head on its end in the casing, a universal joint connection between said head and the casing; a combined ball protector and lubricant retainer having an inner end loosely fitted to the ball and a tubular portion extending around the shaft and through the shaft-opening in the casing, a washer surrounding the tubular portion of the said retainer to prevent escape of lubricant from the casing exterior to said retainer, an annulus attached to the casing and confining said washer in position, a washer fitted against the inner side of the ball head and within the said retainer, and means for yieldably pressing this washer against the head.

ARCHIBALD A. WARNER.